(12) United States Patent
Pastrick et al.

(10) Patent No.: US 9,852,659 B2
(45) Date of Patent: Dec. 26, 2017

(54) PORTABLE MEDICAL TRAINING DEVICE

(71) Applicants: John J. Pastrick, University Heights, OH (US); Christopher E. Bryniarski, South Euclid, OH (US); Mark E. Cook, Stow, OH (US); Timothy E. Lint, North Royalton, OH (US); Daniel R. Moon, Painesville, OH (US)

(72) Inventors: John J. Pastrick, University Heights, OH (US); Christopher E. Bryniarski, South Euclid, OH (US); Mark E. Cook, Stow, OH (US); Timothy E. Lint, North Royalton, OH (US); Daniel R. Moon, Painesville, OH (US)

(73) Assignee: PRESTAN PRODUCTS LLC, Mayfield Village, OH (US)

( * ) Notice: Subject to any disclaimer, the term of this patent is extended or adjusted under 35 U.S.C. 154(b) by 734 days.

(21) Appl. No.: 14/074,284

(22) Filed: Nov. 7, 2013

(65) Prior Publication Data

US 2015/0125840 A1 May 7, 2015

(51) Int. Cl.
G09B 23/32 (2006.01)
G09B 23/28 (2006.01)

(52) U.S. Cl.
CPC .................. *G09B 23/288* (2013.01)

(58) Field of Classification Search
CPC .................................................. G09B 23/288
USPC ........................................................ 434/265
See application file for complete search history.

(56) References Cited

U.S. PATENT DOCUMENTS

| | | | |
|---|---|---|---|
| 3,872,609 A * | 3/1975 | Smrcka | G09B 23/288 264/DIG. 14 |
| 4,984,987 A | 1/1991 | Brault et al. | |
| 5,249,968 A | 10/1993 | Brault et al. | |
| 5,330,514 A | 7/1994 | Egelandsdal et al. | |
| 5,468,151 A | 11/1995 | Egelandsdal et al. | |
| 5,885,084 A | 3/1999 | Pastrick et al. | |
| D429,500 S | 8/2000 | Brault et al. | |
| 6,500,009 B1 * | 12/2002 | Brault | G09B 23/32 434/265 |
| 6,736,643 B2 | 5/2004 | Pastrick et al. | |
| 6,872,080 B2 | 3/2005 | Pastrick et al. | |

(Continued)

FOREIGN PATENT DOCUMENTS

CN 202549144 U * 11/2012
CN 103106828 A 5/2013

*Primary Examiner* — Thomas Hong
*Assistant Examiner* — Jennifer L Korb

(57) ABSTRACT

A portable medical training manikin with a hollow torso body with a chest plate having slotted openings provided to enable realistic flexing of the chest plate along hinges engaged with a chest compression piston. The torso body has a realistic skin covering the torso and interconnected at a hinge. A chest compression piston supports and resists chest compressions performed by a user. The chest compression piston is engaged with the central chest plate of the torso body by a quick release mechanism having detent locks for securing the piston engaged with the chest plate. A two-piece tiltable head configuration enables detachment of the back half of the head piece, and inversion for nested stacking within the front half head piece. The hollow torso body is likewise configured for convenient stacking, including the compression pistons, in a carrying container.

7 Claims, 17 Drawing Sheets

(56) References Cited

U.S. PATENT DOCUMENTS

| | | |
|---|---|---|
| 6,969,259 B2 | 11/2005 | Pastrick et al. |
| 8,465,293 B2 | 6/2013 | Pastrick et al. |
| 2007/0264621 A1 | 11/2007 | Nysaether et al. |
| 2009/0035740 A1 | 2/2009 | Reed et al. |

* cited by examiner

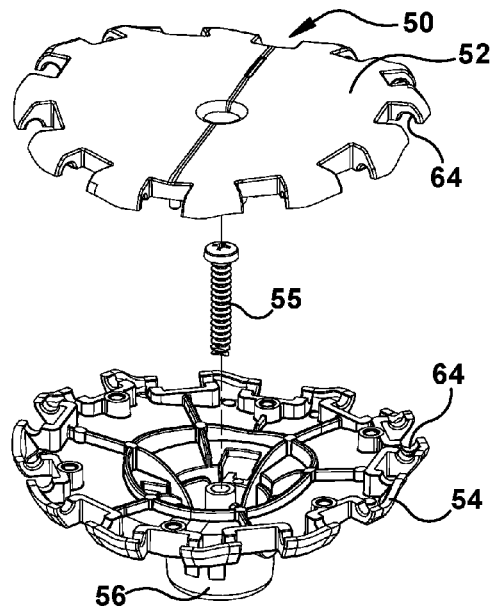
Figure 6A
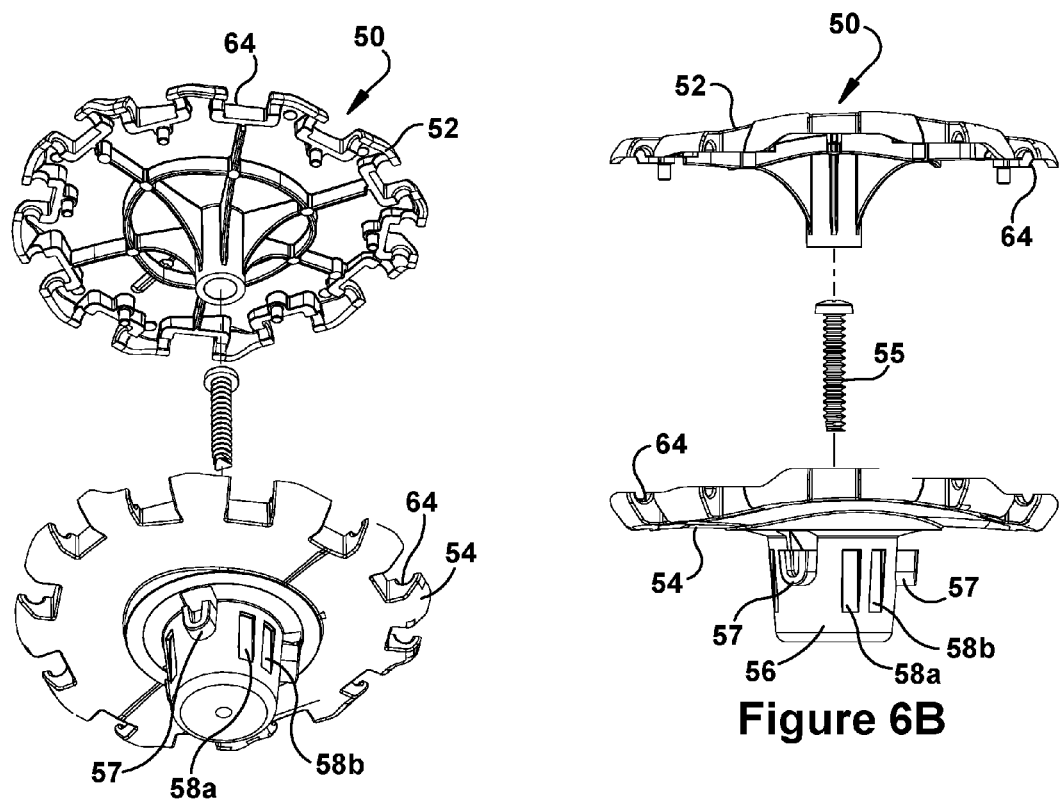
Figure 6C
Figure 6B

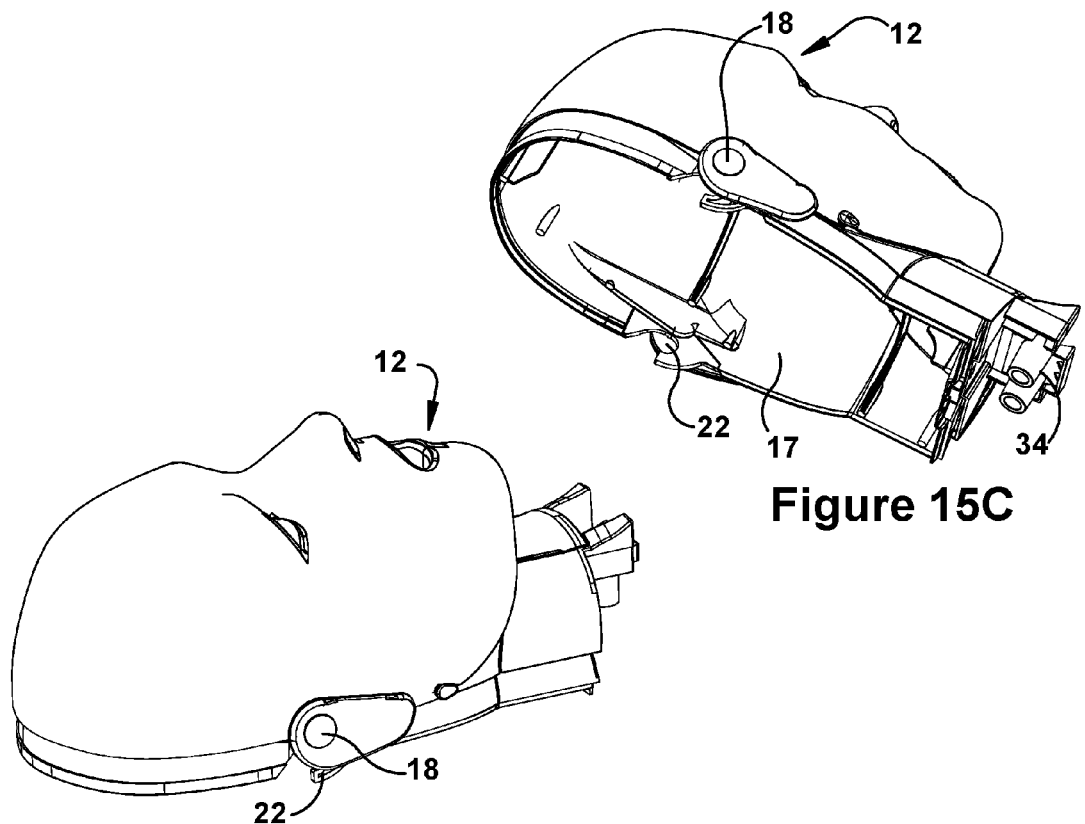
Figure 15C
Figure 15B
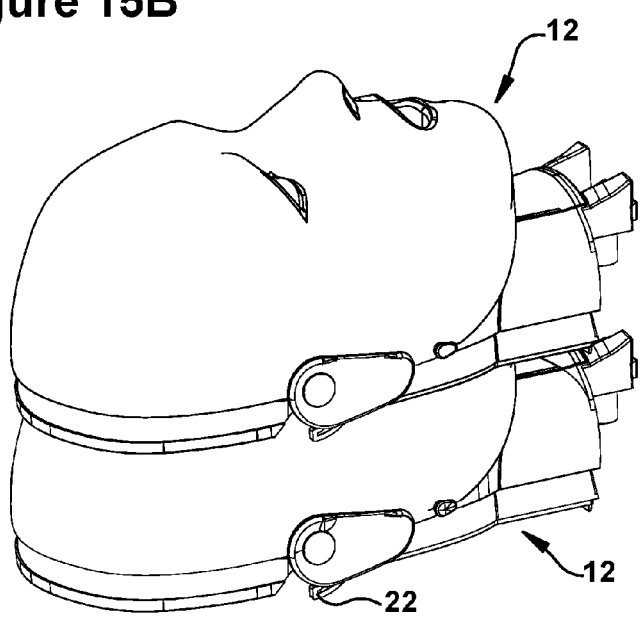
Figure 16

PORTABLE MEDICAL TRAINING DEVICE

FIELD OF INVENTION

The present application is directed to an improved portable medical training device, and more particularly to a portable medical training manikin for teaching cardiopulmonary resuscitation, and to multiple portable manikins which are stackable.

BACKGROUND

Numerous solutions have been offered in the past to provide an inexpensive medical training manikin which can be used in a training environment for a group of trainees. It is desired that such medical training manikins are lightweight for easy transportation to the training site, as well as stackable for compact packing and carrying, capable of simple and quick assembly, readily able to be cleaned or otherwise maintained in a sanitary condition, easy to use, and capable of substantially simulating the functions and responses of a human patient. Additionally, it is desired that a quality product be provided, which is not only lightweight, but of a realistic and durable material which enable a longer product life.

Prior art devices which have attempted to provide solutions to the above include U.S. Pat. Nos. 6,500,009, 5,330,514, 5,468,151, 4,984,987 and 5,885,084.

SUMMARY OF THE INVENTION

The present portable medical training device provides a number of improved features over prior products. The present product has a torso body with a chest having slotted openings provided to enable realistic flexing of the chest along hinges engaged with a chest plate compression piston. The pattern arrangement of the slotted openings is preferably a pattern which allows greater flexure of the torso body while controlling stress and strain in the torso body material during compression by a user. The use of slots also removes material weight and expense, and preferably uses an angular radial pattern arrangement. The pattern arrangement and realistic flexing combine with the rigid chest plate to provide the user with a realistic simulation of the human body, including the rigid sternum (rigid chest plate), ribs having limited flexibility (slotted torso body) and the very flexible costal cartilage which connects the ribs and breast bone (flexible hinges interconnecting the chest plate and torso body). The torso body has a realistic skin covering which does not include a rigid frame.

The improved chest compression piston is provided to support and resist chest compressions performed by a user or trainee. The chest compression piston is engaged with the chest plate of the torso body by a quick release mechanism having detent locks for securing the piston engaged with the chest plate. The piston also includes a large spring, providing approximately 65-80% of the total design pressure resistance during compressions, which spring is engaged with the piston using a locking ring. Essentially, the chest compression piston is provided with an outer sleeve, a telescoping inner sleeve which engages the locking ring or piston sleeve bushing, the large spring, and a cap which secures the chest compression piston components in position.

Additionally, a two-piece tiltable head feature is also provided. A head may include mechanical mounting structure for secure attachment of an improved lung bag or face shield. The head may also include a nose feature to provide a realistic representation of nasal cartilage, and a realistic neck assembly. Additionally, an electro-mechanical indicator device may be provided to show real time feedback of the CPR compression rate being administered by a student on the training manikin of the present application. The feedback by the device may be provided preferably by visual indicators, but may also have, or alternatively have, audio indicators or signals, such as words or sounds, to indicate whether or not the student is compressing within the preferred rate range, and/or the degree of variance in the student's compression sequences. The indicator device also includes an automatic on/off sleep feature which is activated by use and non-use of the present training manikin.

The size, shape and configuration of the torso body and head of the present manikins enables packing advantages not previously provided. The two-piece head configuration enables detachment of the back half of the head piece, and inversion for nested stacking within the front half head piece. The torso body is likewise configured for convenient stacking and arrangement within a carrying container.

DESCRIPTION OF THE DRAWINGS

FIG. 6A is an exploded perspective top view of the top and bottom portions of the chest compression plate shown in FIG. 7A.

FIG. 6B is an exploded side view of the chest compression plate components shown in FIG. 6A.

FIG. 6C is an exploded perspective bottom view of the top and bottom portions of the chest compression plate shown in FIG. 6B.

FIG. 15B illustrates the head assembly of FIG. 15A with the back of the head component nested in reverse position within the back of the face portion of the head assembly.

FIG. 15C illustrates a back perspective view of and embodiment of the head assembly of FIG. 15B.

FIG. 16 schematically illustrates two head assemblies of the type shown in FIG. 15B stacked in position for packing or storage.

DETAILED DESCRIPTION

Figure 1:
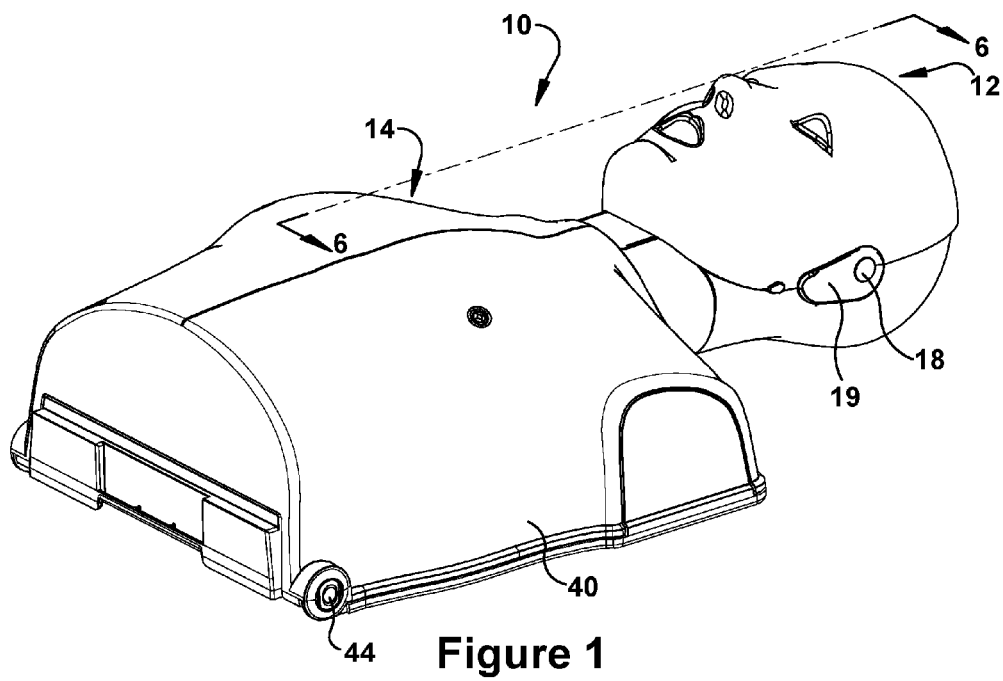
FIG. 1 is a perspective view of the portable improved medical training device of the present application, shown with the outer skin in a closed position with respect to the torso body.
Figure 2:
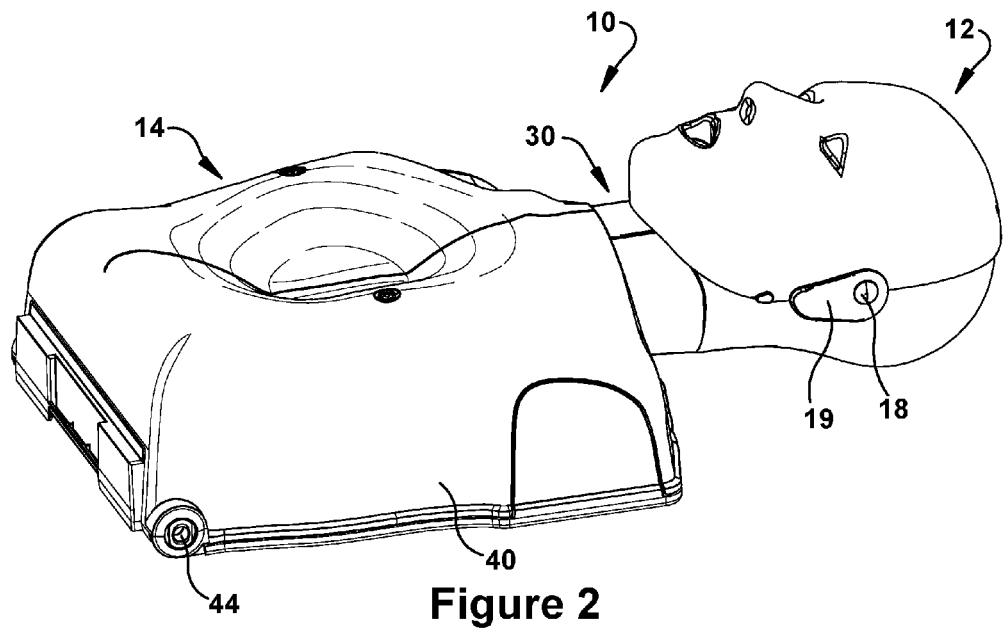
FIG. 2 is a perspective view of the portable improved medical training device of FIG. 1, and showing the torso body in a compressed position.
Figure 2A:
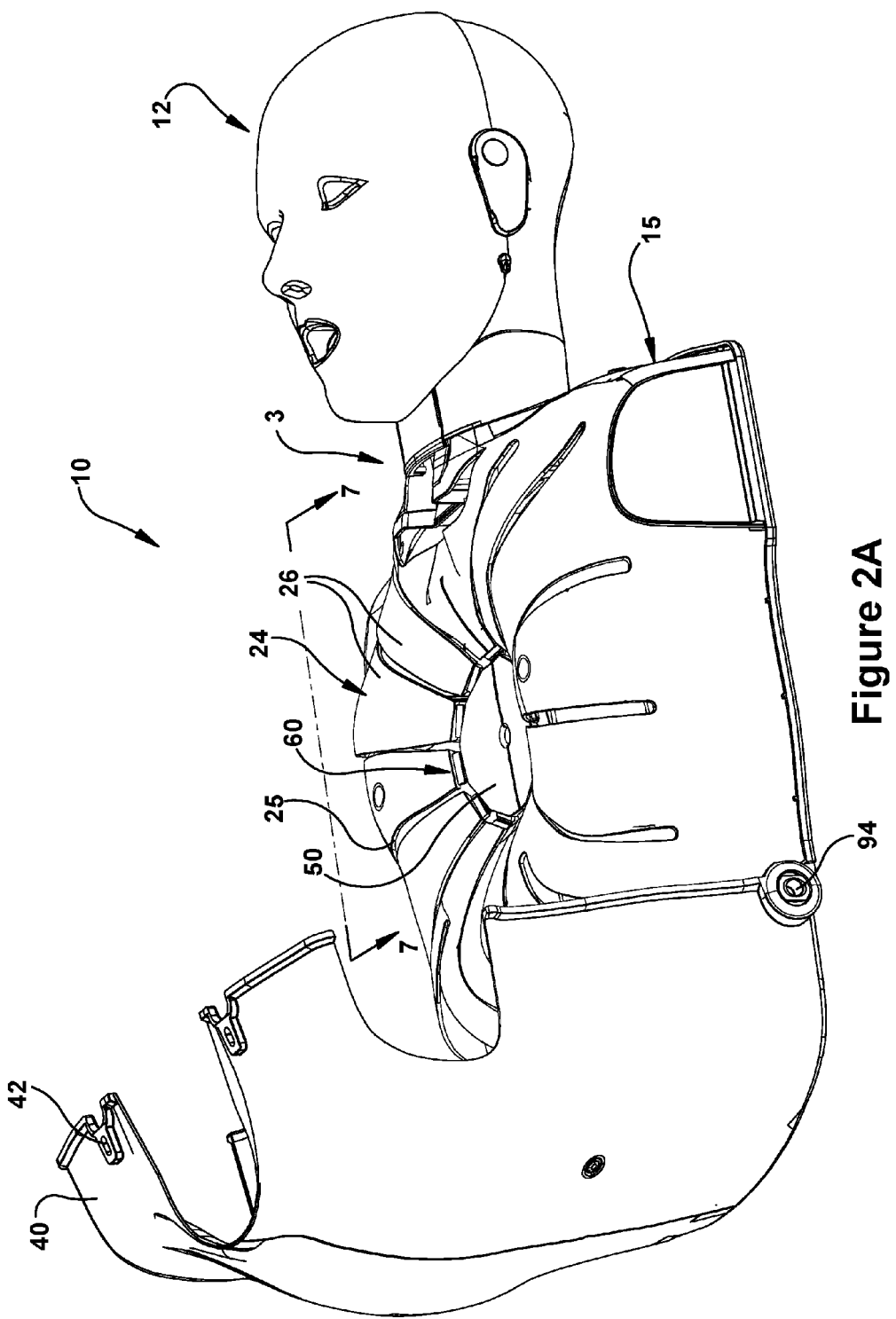
FIG. 2A is a perspective view of the portable improved medical training device of FIG. 1, and showing the torso body in a compressed position with the skin covering the torso body.
Figure 3:
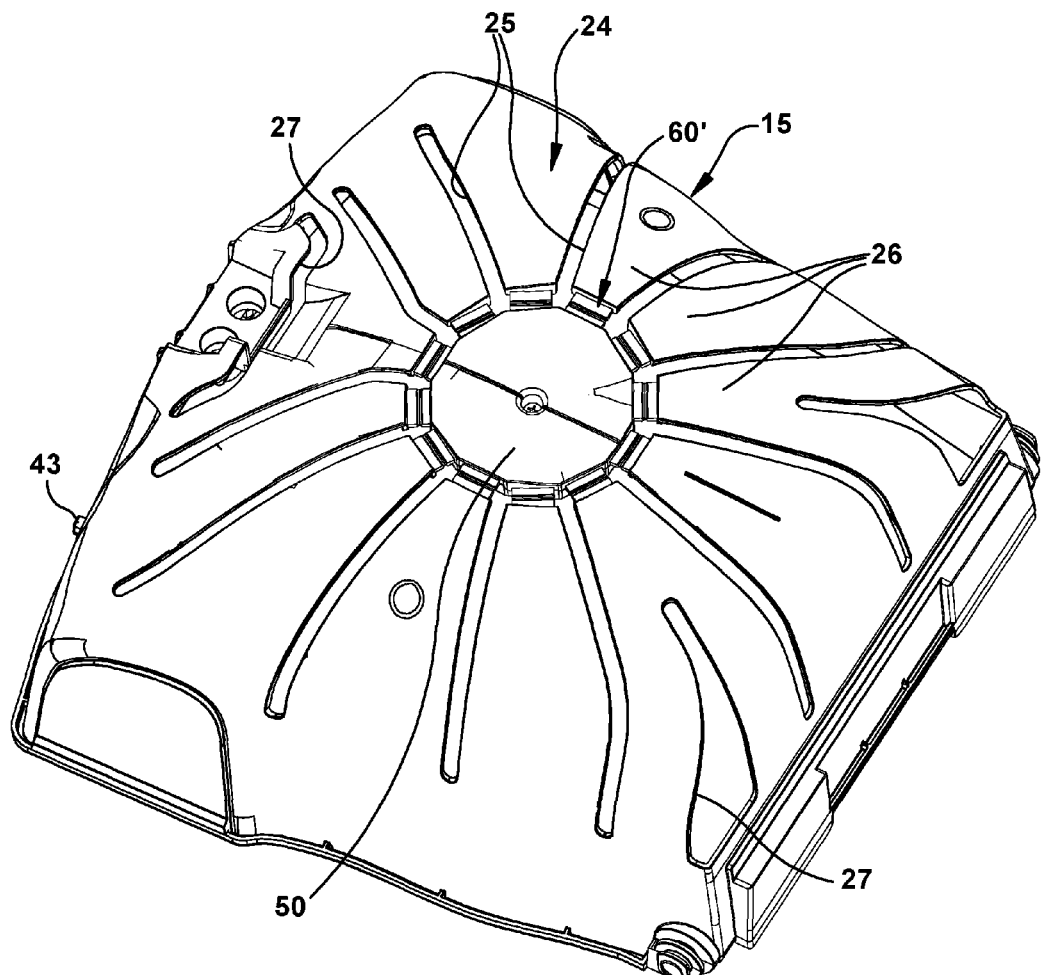
FIG. 3 is a partial top perspective view of the torso body of the portable improved medical training device.
Figure 4:
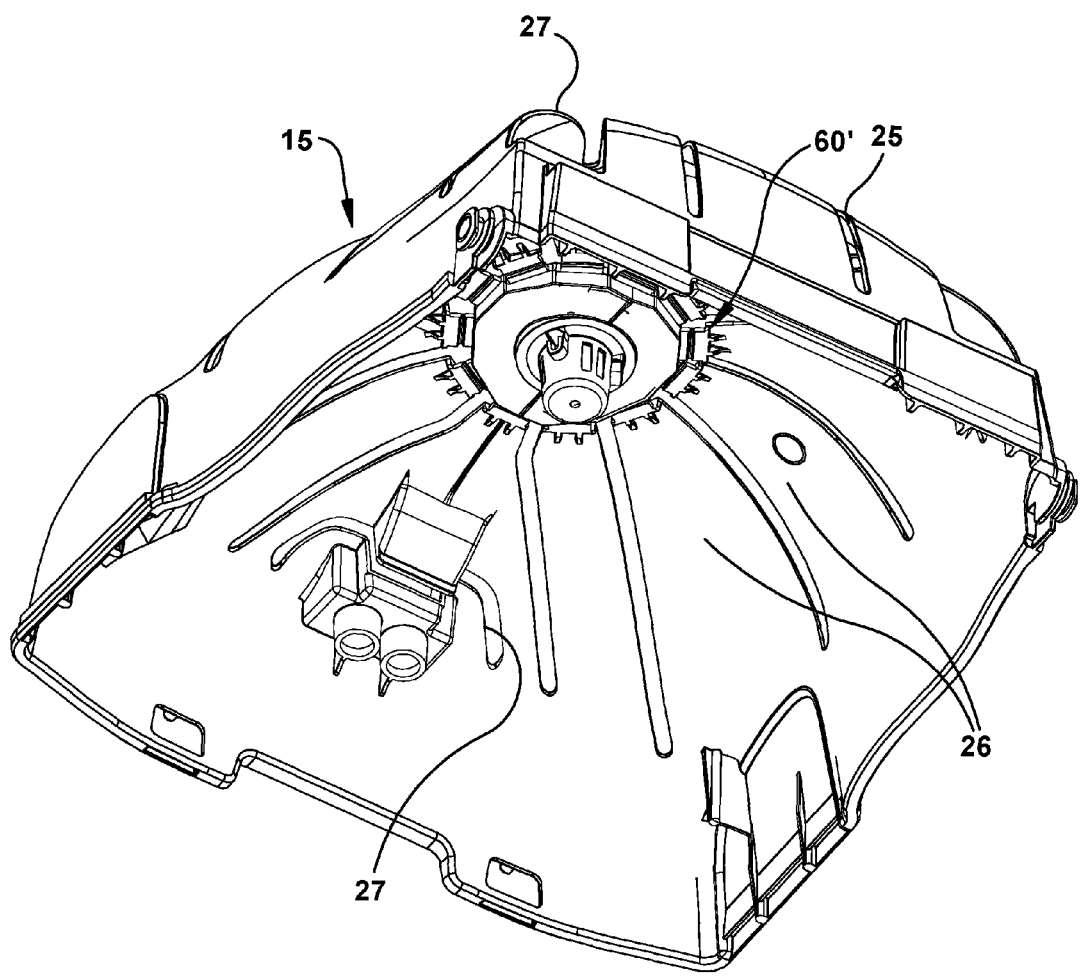
FIG. 4 is a partial bottom perspective view of the torso body shown in FIG. 3, but with portions of the chest compression piston removed.

The present application provides an improved portable medical training device 10. A general view of the embodiment of the improved portable medical training product or device 10 is shown in FIGS. 1 and 2. Unless otherwise indicated, it is noted that the illustrations may include graphical contour lines which are surface illustrations and do not form part of the design. Additionally, aspects of the various embodiments of the improved portable medical training devices described herein which are similar or alternative embodiments, may not be distinguished in further detail, other than by the use of a prime designation in connection with the later described embodiments.

The improved device 10 includes a torso body 14 which is a two-piece clam shell style, having a torso 15 and outer skin cover 40. The improved two-piece torso body 14 is shown in open position in FIGS. 1 and 2, with the outer skin cover 40 raised to the open position using a hinge 44 located at the bottom edge of the torso 15. The outer skin cover is rotated to the closed and secured position in FIG. 5. The hinge 44 is preferably provided with a stop, so that the outer skin cover may not rotate past the fully open position illustrated in FIG. 1. The outer skin cover 40 is preferably of a thin pliable material, and is preferably a molded elastomeric material which provides a realistic feel of human skin.

The torso 15 is covered by the pliable outer skin cover 40, as shown in FIG. 2, and is secured by engagement of openings 42 formed in the skin, over pegs or buttons 43, extending from the torso. The torso 15 is preferably of a single hollow molded bendable material, such as a polyolefin material or similar polymer. Polyolefin, for example, has a relatively high elastic elongation, so the material may be bent or stretched further without incurring permanent deformation. The present torso design bends, flexes or stretches to achieve the desired compression simulation of cardiopulmonary resuscitation ("CPR"). The designs of the illustrated torso optimize the life of the torso material under the stress and strain required to simulate compressions on a human during CPR. However, it should be understood that the flexible elasticity of the torso alone is insufficient to simulate the flexibility of the costal cartilage, which in the present design is supplemented with the use of a hinged central chest plate to more fully simulate the movement of the human body during CPR.

The present manikin training device 10 also provides for a very realistic simulation of the human body. Specifically, the torso design provides a chest 24 which has openings or slots 25 which interconnect with the central chest plate 50 along hinges 60 which may be of various designs. The pattern arrangement of the openings 25 is preferably of an angularly arranged star or radial pattern which allows flexure of the torso 15 while reducing stress and strain in the torso material during compression by a user. Twelve openings or slots 25 are shown in an angularly spaced radial pattern, which form 12 rib portions 26, while the ends of the rib portions are each in hinged engagement with the central chest plate 50. It should be understood that at least 1 slot and 2 rib portions should be provided to enable the minimum flexibility of the chest area. The use of additional slots removes material weight and expense. Additional openings 27 may also be provided within the torso 15 to enable the desired balance of flexure which may more exactly duplicate human anatomy. The slotted openings 25 and resulting rib portions 26 simulate the limited flexibility provided by human ribs, and enable realistic movement of the chest 24 upon compression of the central chest plate 50, which moves along the very flexible hinges 60, as shown in FIG. 2, which simulate the very flexible costal cartilage interconnecting the ribs and breast bone. Thus, the present device design has a rigid central chest plate 50, simulating the rigid human breast bone or sternum, a surrounding chest or chest area 24 of rib portions 26 which simulate some, but limited, flexibility as do the human ribs and rib cage; and multiple hinges 60 interconnecting the rib portions 26 and the central chest plate 50, which hinges 60 are very flexible to simulate the very flexible interconnecting costal cartilage.

Figure 5:
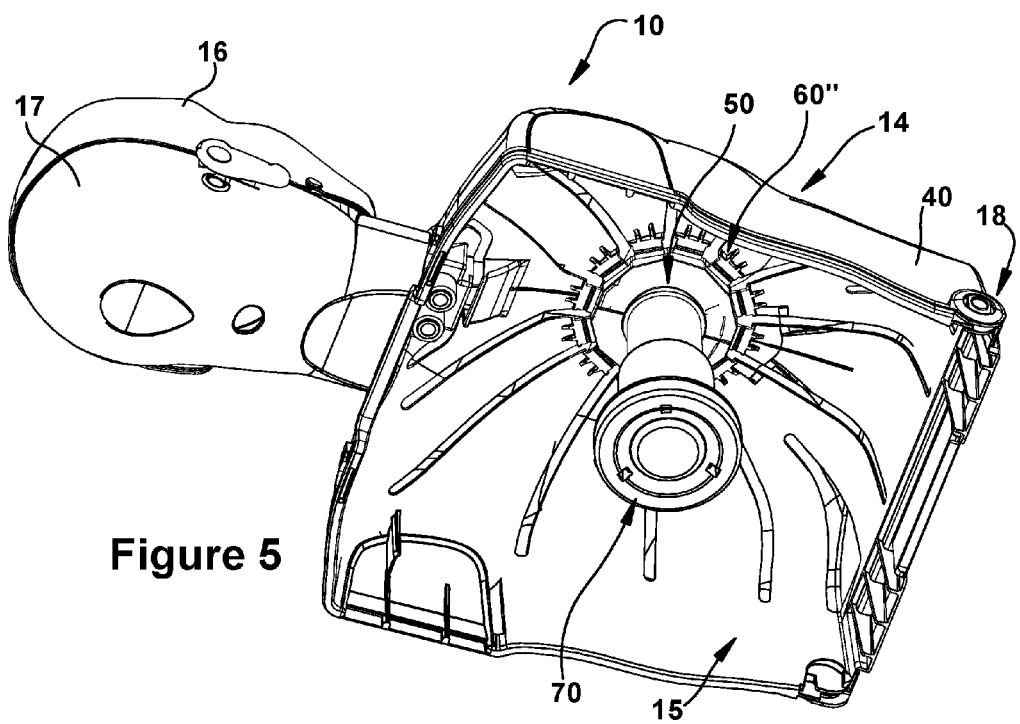
FIG. 5 is a bottom perspective view of the portable improved medical training device having mechanical hinges, assembled with the head, neck and chest compression piston and shown in uncompressed position.
Figure 5A:
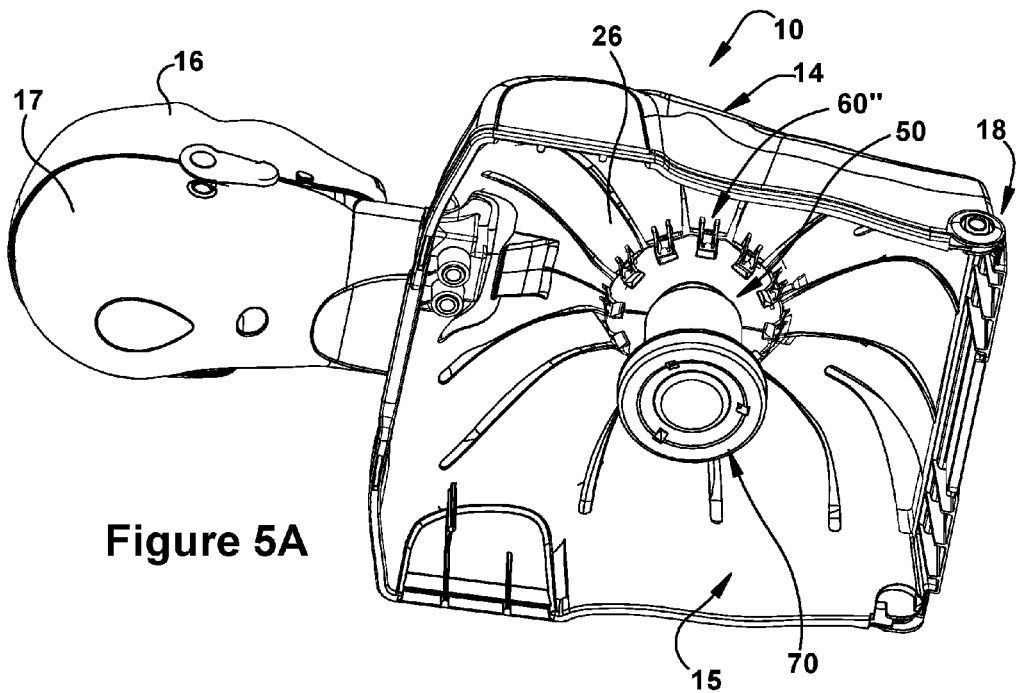
FIG. 5A is a bottom perspective view of the portable improved medical training device of FIG. 5, but with the device shown in compressed position with the torso body flexing along the hinges engaged with a chest plate having a chest compression piston attached.
Figure 6:
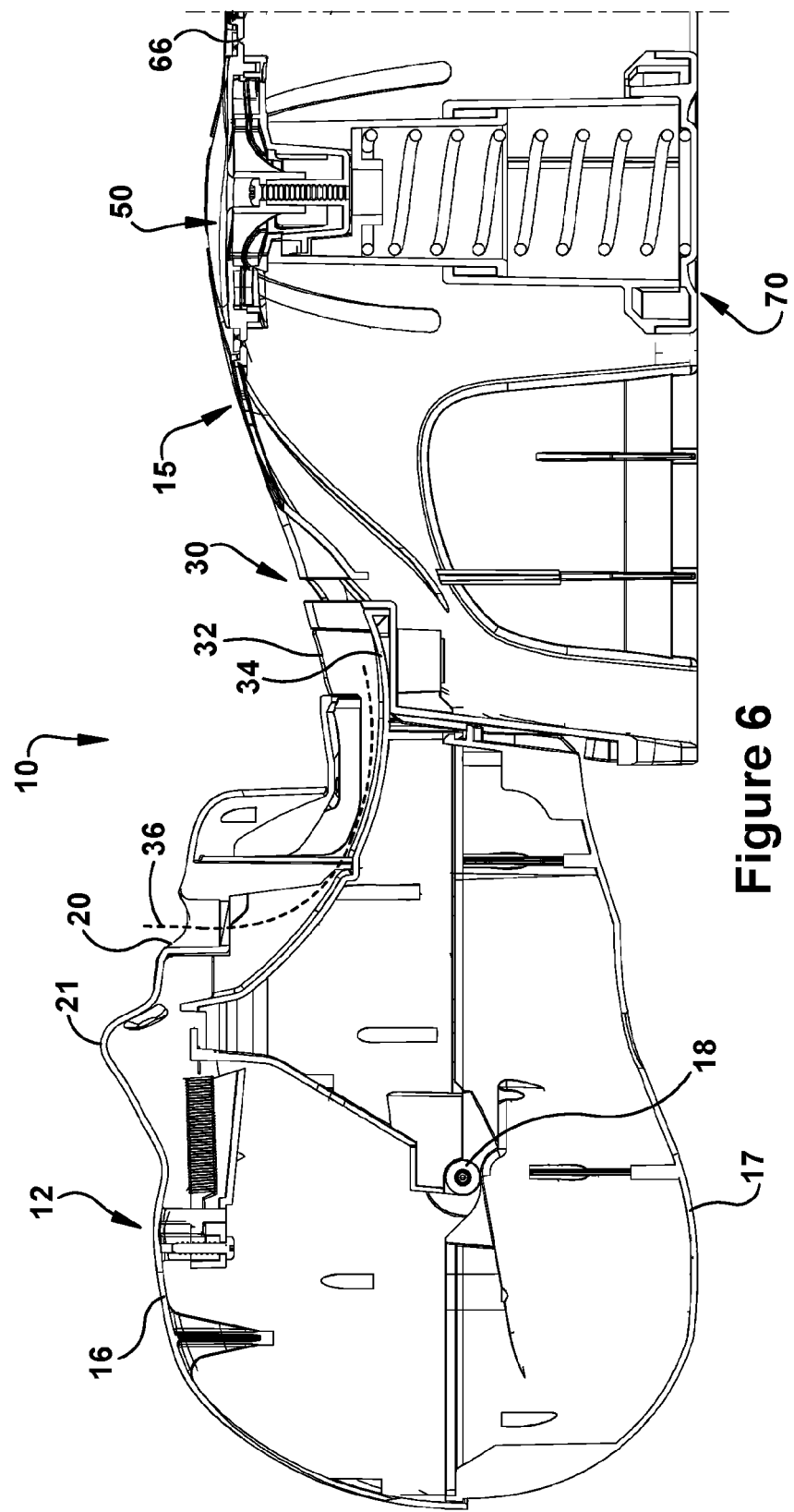
FIG. 6 is a schematic, cut-away side view of the improved portable medical training device taken along the line 6-6 of FIG. 1 (but with the skin in open position).
Figure 7:
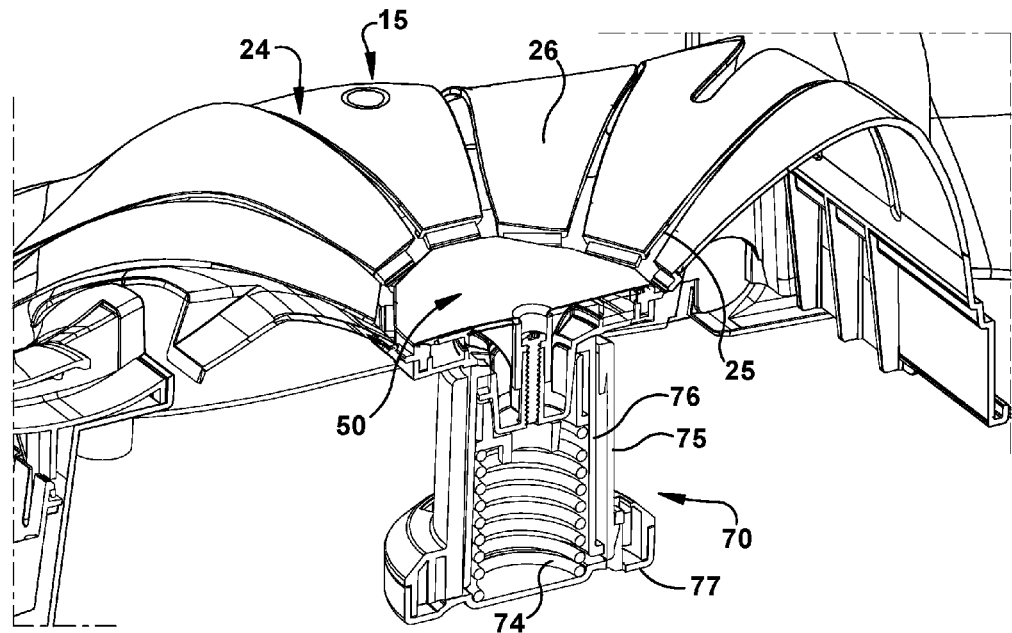
FIG. 7 is a schematic, cut-away side view of the improved portable medical training device taken along the line 7-7 of FIG. 2A.
Figure 7A:
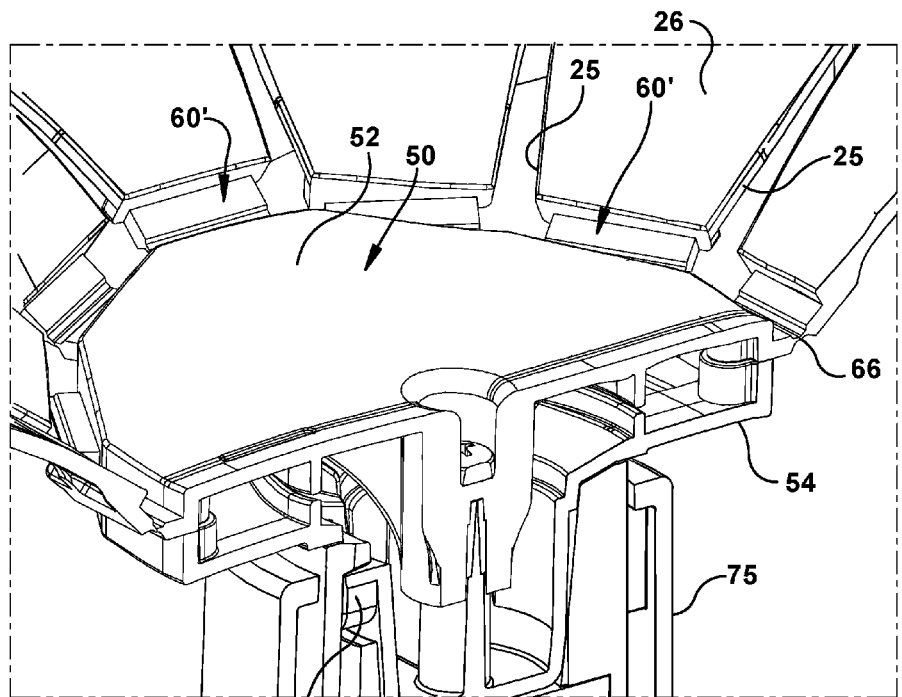
FIG. 7A is a schematic partial, enlarged, cut-away side view of a living hinge embodiment of the compressed chest of the torso body shown in FIG. 7.
Figure 7B:
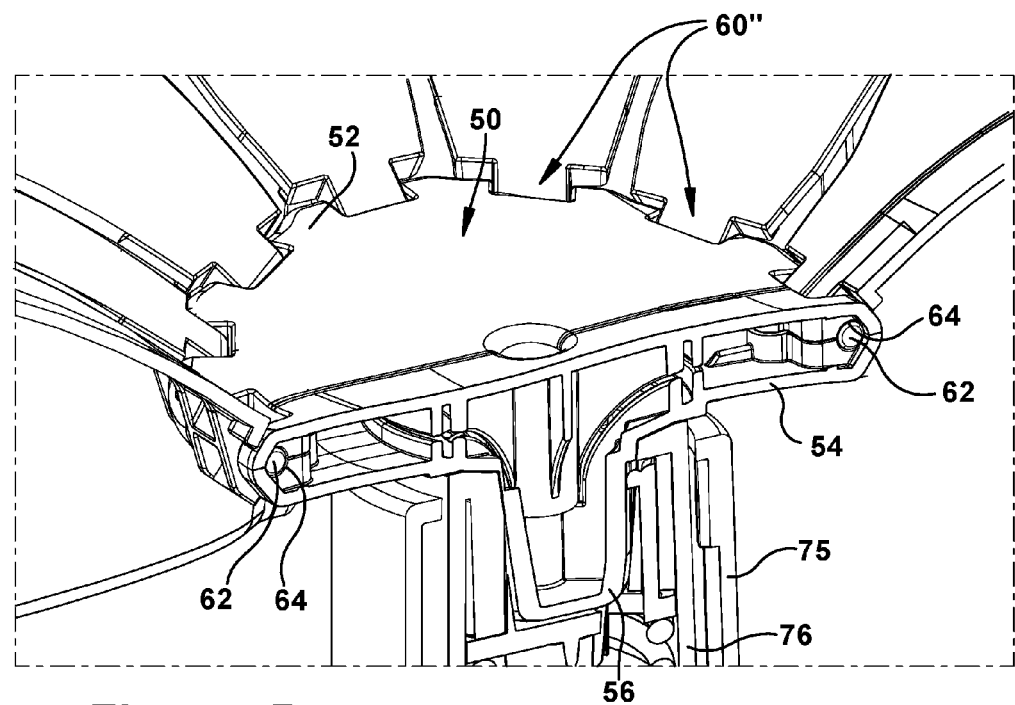
FIG. 7B is a schematic partial, cut-away side view of a mechanical hinge embodiment of the compressed chest of the torso body.
Figure 8:
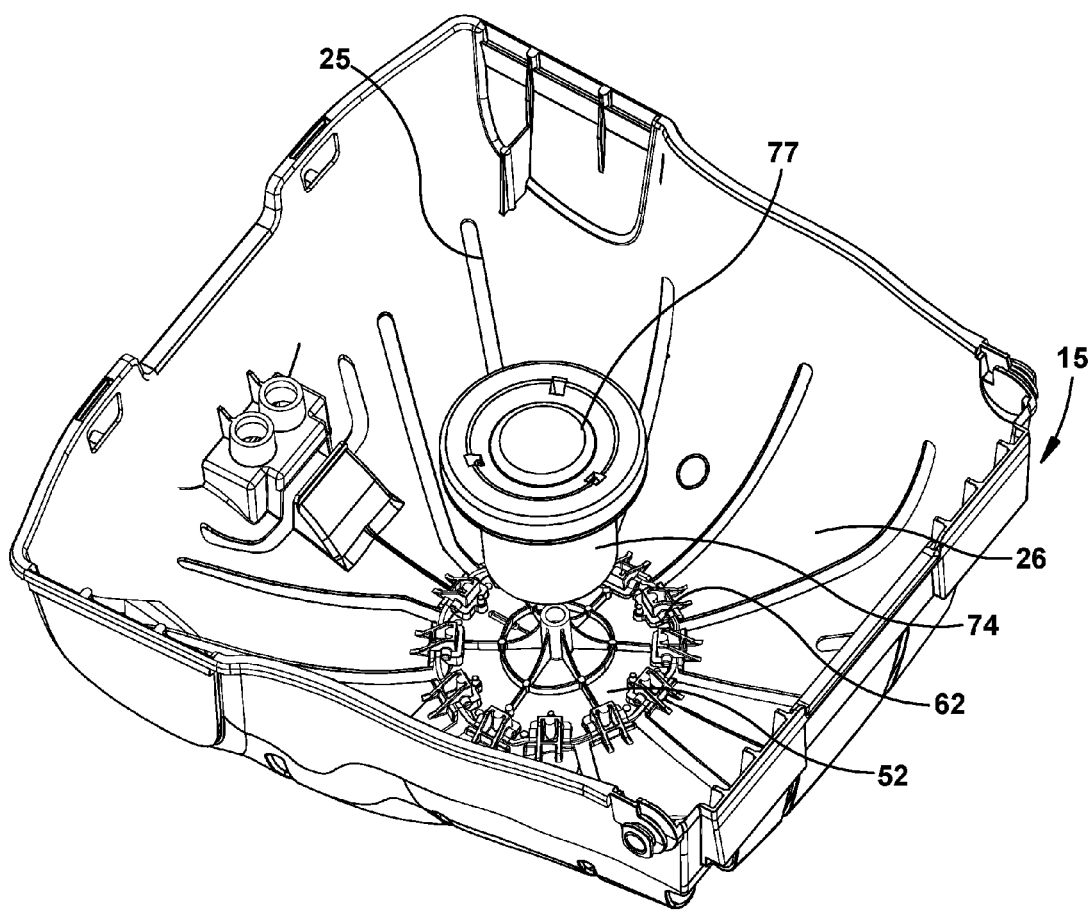
FIG. 8 is a partial bottom perspective view of a torso body and detached chest compression piston.
Figure 9:
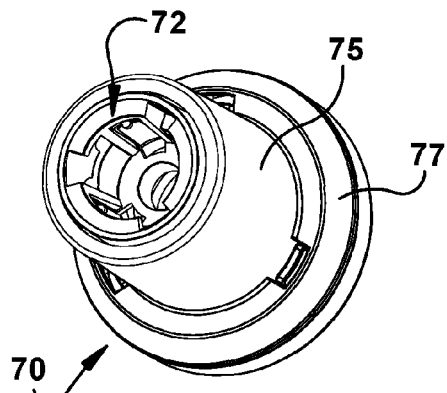
FIG. 9 is a top perspective view of a compressed chest compression piston.
Figure 10:
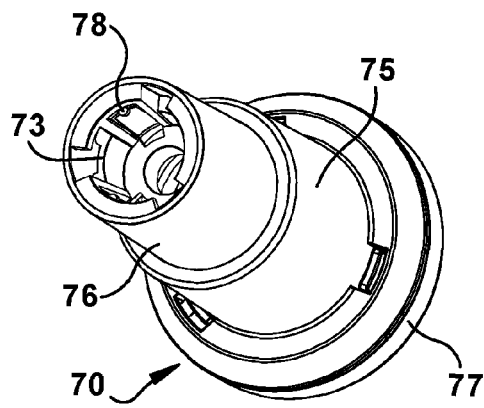
FIG. 10 is a top perspective view of an uncompressed chest compression piston.
Figure 11:
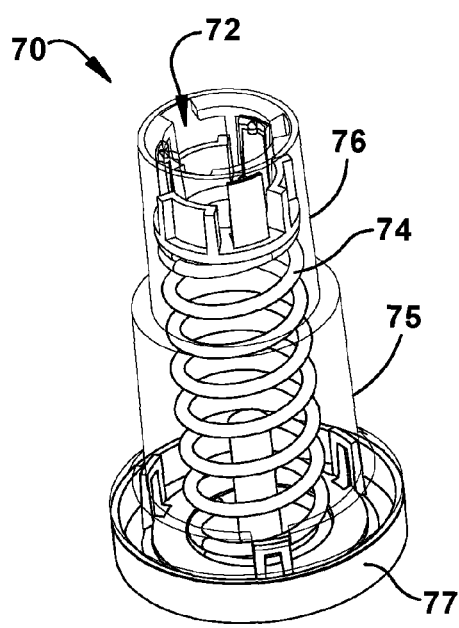
FIGS. 11 and 12 are schematic side perspective views of the uncompressed chest compression piston, illustrating the internal components of the chest compression piston.
Figure 12:
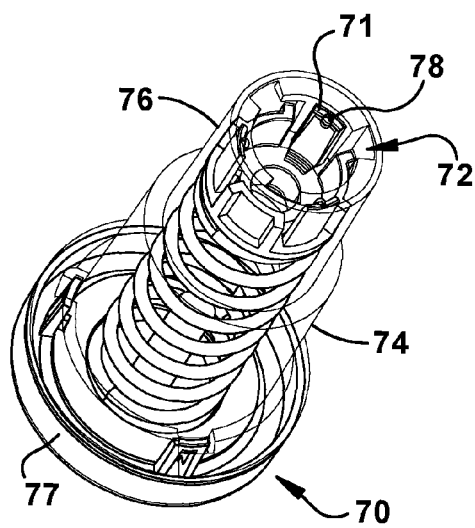

As illustrated, the central chest plate 50 is provided as a top plate portion 52 and a bottom plate 54 portion, secured by a conventional fastener 55, which are used to capture the ends of the rib portions 26 to form the hinges 60. The hinges 60 are illustrated as formed in part with the ends of the rib portions, which may be formed either having a living hinge 60' design arrangement, in FIGS. 2A, 3, 6, 7 and 7A, or a mechanical hinge 60" design arrangement having engaged male and female members, FIGS. 5-5A, 7B. Either arrangement enables flexing movement of sections of the chest 24 at the hinges 60. FIGS. 1-4 and 7 illustrate a living hinge arrangement, while FIGS. 5, 7A and 8 illustrate mechanical hinges having posts 62, or male component members, extending from the ends of the rib portions 26, and which are engaged with and captured by and between openings, or female component members 64, formed by the top 52 and bottom 54 mating plates of the central chest plate 50. The central chest plate 50 is approximately 3.25 inches in diameter, and is supported by a chest compression piston 70.

The improved chest compression piston 70 is provided to support and resist chest compressions performed by a user or trainee. The chest compression piston is engaged with the back of the bottom plate 54 of the central chest plate 50 by a quick release mechanism having detent locks, shown as 3 locking tabs in FIGS. 4 and 7-12, for securing the piston into locking engagement with the central chest plate using a twist on-off arrangement. As shown, the back of the bottom plate 54 of the central chest plate has a central boss portion 56 with 3 U-shaped flanges 57 extending from the central boss portion. Additionally, 2 spaced grooves 58a, 58b are shown intermediate the flanges. The flanges 57 and grooves 58 each engage a locking bushing 72 of the compression piston 70 for locking engagement between the central chest plate and the piston.

The chest compression piston 70 includes a large spring 74, providing approximately 65-80% of total pressure resistance during compressions. It is understood that the remaining pressure resistance is provided by the flexural modulus of the molded polymer used for the torso device design. Any combination of spring resistance and torso flexural modulus may be used to obtain the desired compression force or resistance during performance of CPR by a user of the present device. The spring 74 is engaged within the piston using a locking ring or bushing 72. The chest compression piston 70 is also provided with an outer sleeve 75, a telescoping inner sleeve 76 which engages the locking ring or bushing 72, the large spring 74, and a cap 77 which secures the chest compression piston components in position. The locking ring or bushing 72 includes L-shaped slots 73 for mating and locking engagement with the U-shaped flanges 57, which is provided upon engaging and turning the U-shaped flanges within the L-shaped slots. While the locking ring 72 is illustrated as a separate piece, it is understood that the features of the locking ring may be integrally molded as one piece within the inner sleeve 76. Additionally, the locking bushing 72 includes 3 flexible tabs 71 having locking detents 78 extending radially inward, such that upon initial engagement of the central boss 56 of the central chest plate 50 into engagement with the locking bushing 72, the locking detents 78 on the flexible tabs 71 of the bushing are engaged within a first spaced groove 58a, but upon turning or twisting of the piston by the user, the flexible tabs 71 are moved radially outward and then back inward, such that the locking detents 78 are then engaged in a locked position, with the locking detents 78 engaged within a second spaced groove 58b and resist removal from engagement. In this locked position, the chest compression piston 70 remains engaged with the central chest plate 50 for performance of CPR compressions. In accordance with the design, a stop is provided to ensure that the proper depth of compression is achieved. An audio response may also be provided using a clicker mounted on the inside of the busing, such that upon reaching the full compression, a noise indication is provided to the user. Likewise, the height of the inner and outer sleeves 76, 75 is such that at maximum compression, the bottom of the inner sleeve 76 reaches the cap. Optional electrical contacts may likewise be provided at this location, to provide a visual indication that the desired compression has been achieved.

It should be understood that the present design of the central chest plate realistically simulates the mechanical characteristics of the human breast bone. The central chest plate 50 may be manufactured as either a single unit or two pieces. During CPR, the breast bone does not bend, while the cartilage interconnecting the breast bone and the ribs provides the necessary flexing. In the present improved device, the central chest plate 50 likewise does not bend, but moves vertically downward under compression by the hands of the user/trainee, causing the flexing of the chest area 24 and movement of the hinges 60. The components of the central chest plate 50 may be manufactured of a more rigid material, such as nylon, or other substantially rigid polymer materials.

It is also understood that the rib portions 26 of the torso chest area 24 may be manufactured using polypropylene material. Such material may be used for manufacturing integral, injection molded living hinges of the type illustrated in FIGS. 1 to 7. Polypropylene (PP) part designs provide strong living hinges with extended flex life. Below a certain thickness it is well known that during molding the PP molecules orient themselves in the direction of flow as they pass through the thin hinge area. Bending perpendicular to this orientation provides in a stronger part that does not break with repeated flexing, which are called "living hinges." Living hinge designs are commonly used where two parts are more easily produced in one molding operation. FIG. 7 illustrates the thin space 66 at the ends of the rib portions 26, which form living hinges 60'. It should be understood that while FIG. 7 shows the living hinges formed as one piece with the top plate 52 of the central chest plate 50, an alternative design could include the entire central chest plate molded as one piece with the interconnected living hinges, or with the living hinges integrally molded with a bottom piece 54 of the central chest plate 50. Where the chest plate and torso body are a single molded piece, material strengthening ribs or other structural additions are used to add rigidity to the central chest plate.

Figure 13:
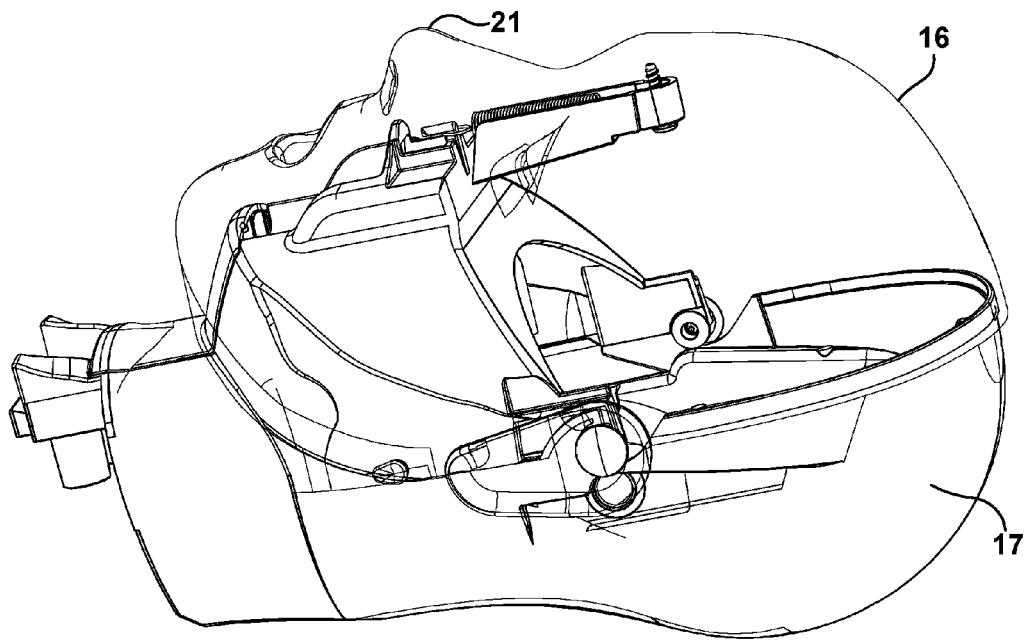
FIG. 13 is a schematic side perspective view of a the head assembly of the portable improved medical training device of FIG. 1, with the transparent face portion of the head assembly illustrating the internal arrangement of the neck and back of the head assembly components.

The use of a two-piece torso body allows for fast and easy opening and closing of outer skin 40 for quick installation of a lung bag which enables simulation of lung and chest expansion, particularly through the pliable outer skin cover 40. As illustrated in the figures, the pliable outer skin portion 40 is molded to include simulated landmarks commonly found on the human torso for use during student training and CPR performance. Additionally, the torso body 14 opens to capture and secure a head 12 at a neck assembly 30. The neck assembly 30 is illustrated in a position generally opposite the hinge 44. A neck assembly 30 of a variety of designs may be provided as shown in FIGS. 6, 13-14.

The improved two-piece head 12 is provided with molded head pieces, where the front half of face portion 16 is movable/tiltable, and the back half or base head portion 17 is stationary. While the nose 21 may be formed as one piece with the face portion, alternatively, a pliable simulated nose cover may be added to the face portion 16. The use of a nose cover enables the realistic nose pinch during a nose pinch, but eliminates the need for a full face cover, which addresses the desire for additional weight reduction considerations. The nose cover covers a simulated rigid nose cartilage portion with a removable pliable cover portion over said simulated rigid nose cartilage. The nose cartilage portion is formed as a part of the rigid face portion 16, with the removable cover portion formed of pliable material with openings simulating nostrils. The cover portion is snapped into place over the nose cartilage portion to simulate skin.

Pivot points 18, forming a pivot axis, are provided to interconnect the head and face portions near simulated ears 19 located on opposing sides of the base head portion 17, which is similar to the natural pivot location of the human head generally at the top of the spine. The use of pivot points 18, and a single pivot axis, near the ears 19, eliminates the need for more complex multiple piece pivot designs that are often necessitated by movement of the back of the head. In the illustrated embodiment of FIG. 16, a hook 22 is used to easily interconnect the two halves of the head.

Figure 14:
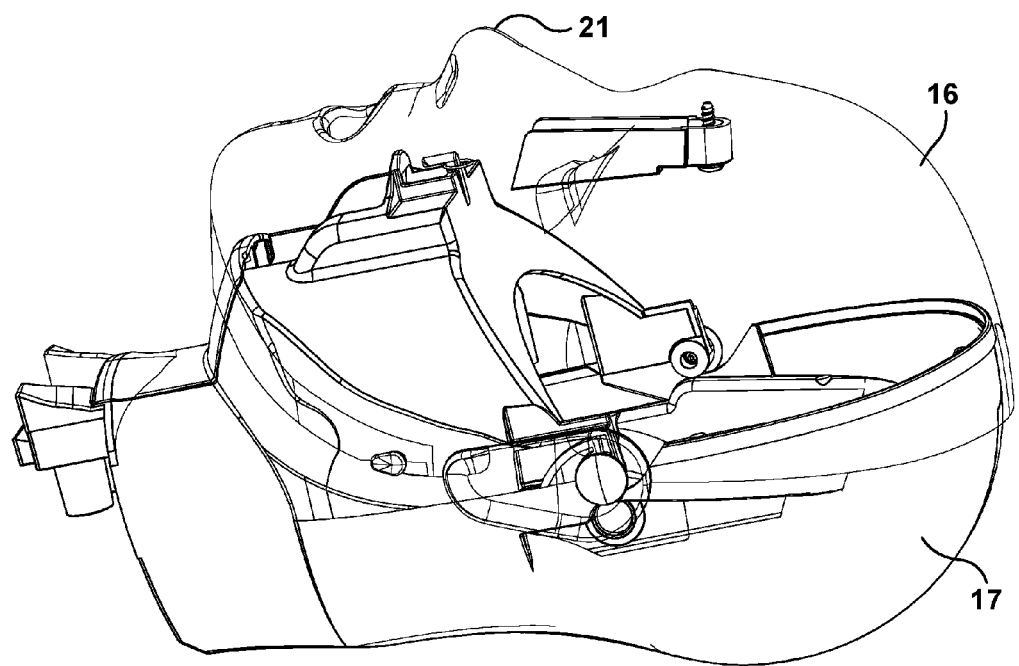
FIG. 14 is a schematic side perspective view of the head assembly of FIG. 13, but with the head assembly titled to a chin up position.
Figure 15:
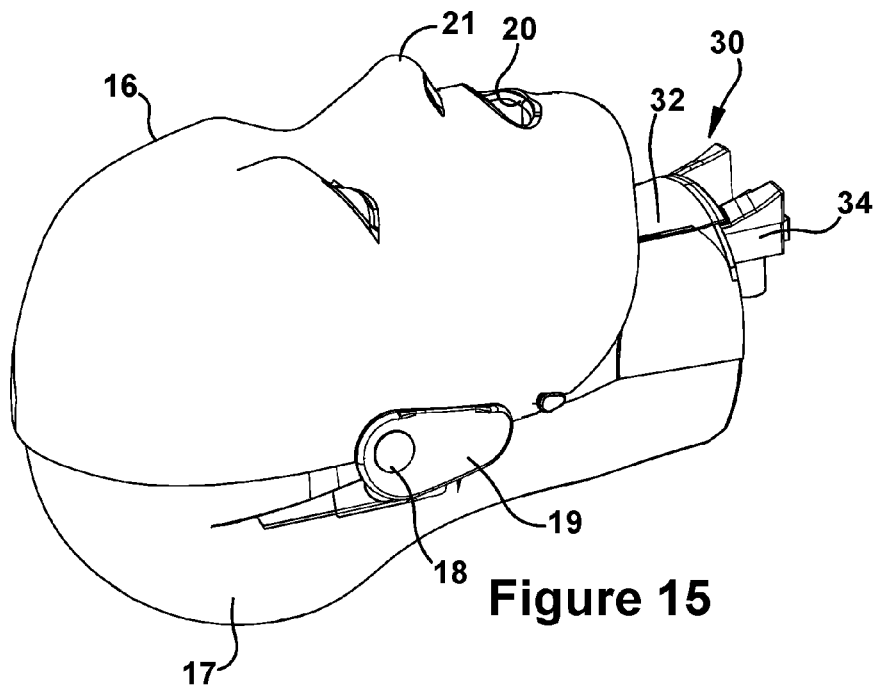
FIG. 15 illustrates the head assembly of FIG. 1.
Figure 15A:
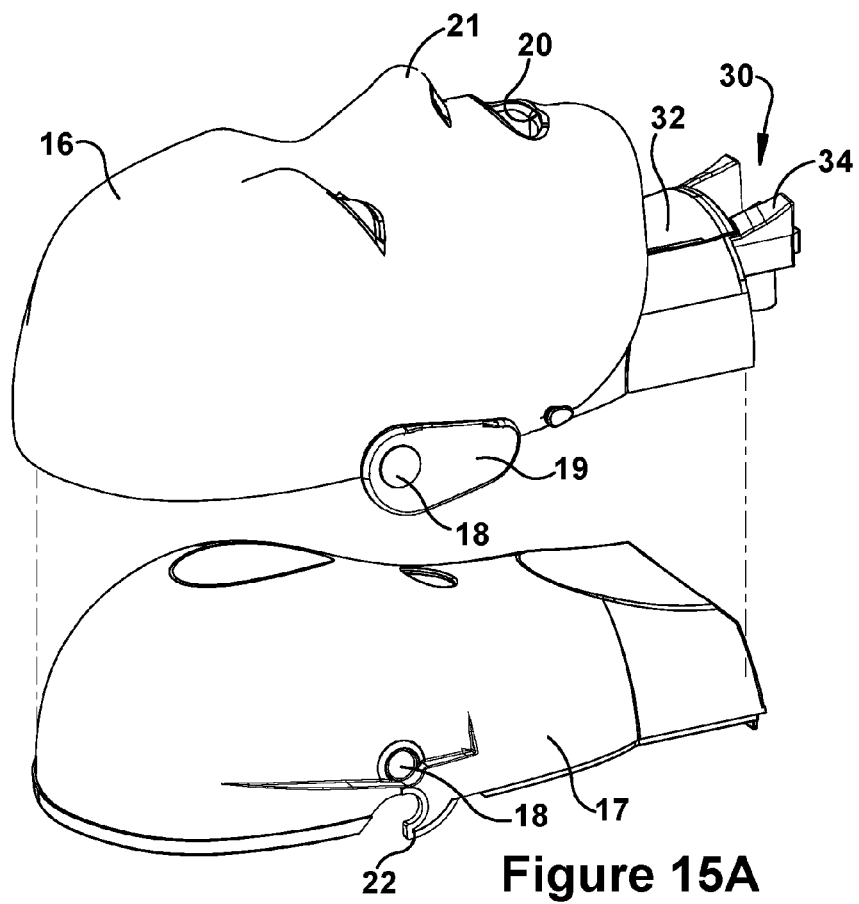
FIG. 15A illustrates the head assembly of FIG. 15, with the front and back halves of the head disassembled, and the back half of the head inverted or in reverse position.
Figure 17:
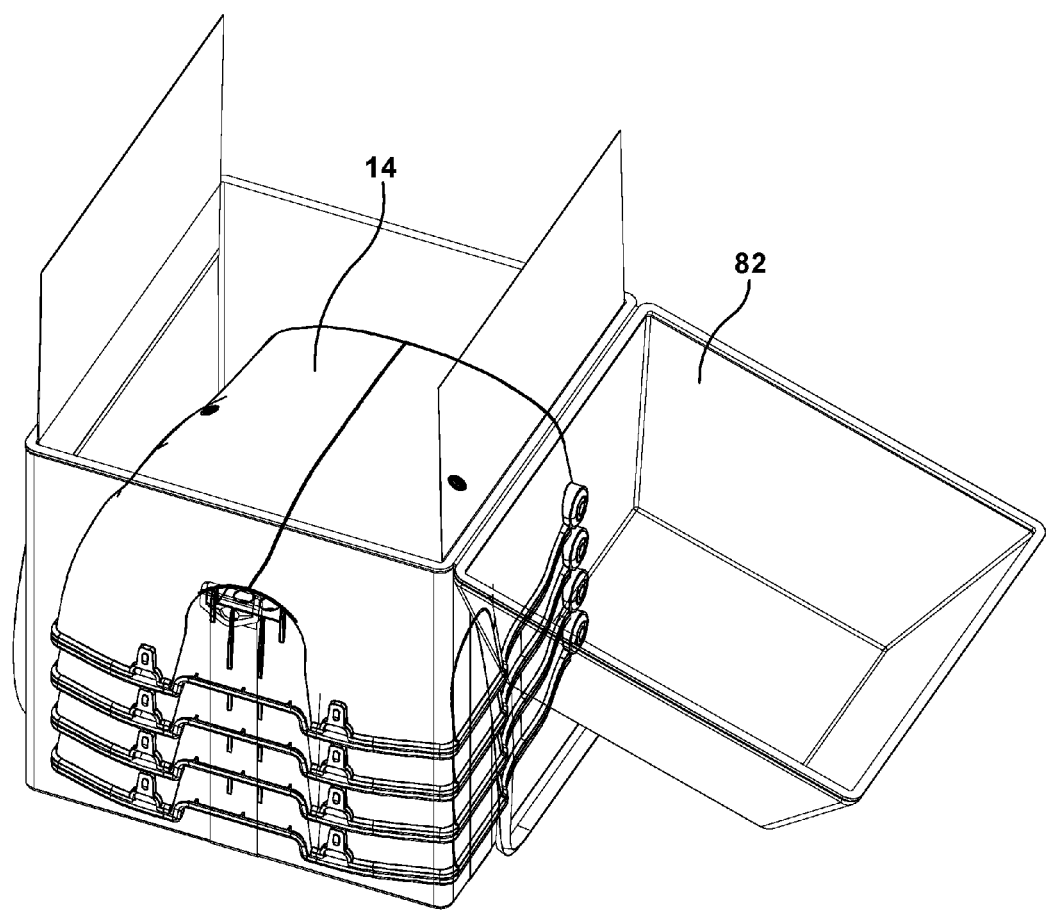
FIG. 17 is a schematic illustration of the portable improved medical training device with the stacked torso bodies shown positioned within a lightweight, flexible carrying container (shown as a transparent container for viewing the packing arrangement).

The front half or face portion 16 of the present device pivots at the pivot points 18, which define the single pivot axis, or is tilted by either a tilt of the forehead (pressing against the forehead) and lifting the chin to the position shown in FIG. 14. In particular, the two pieces of the head may be biased by a spring positioned intermediate the two pieces of the head 12 and internally, as shown in FIG. 6. The design is preferably such that the jaw of the front or face portion 16 must be moved to a certain level or position before the forehead may be tilted back as provided by the mechanical shape of the pivot mechanism.

The two-piece head pieces are shown in a variety of positions in FIGS. 6, 13 and 14. In the illustrated embodiments, a neck assembly 30 for attachment to the fixed face portion 16 is provided. The lung bag also passes through the neck assembly 30 during engagement within the head 12 and torso 14 of the improved medical training device 10. In the embodiments of FIGS. 6, 13 and 14, the neck assembly 30 is provided integrally with the back head portion 17 such that the lung bag is threaded through a mouth opening 20 in the face portion 16, through a fixed neck assembly 30 and into the torso 14 positioned intermediate the skin 40 and torso.

In FIG. 6, a base portion 34 of the neck assembly 30 is provided as a part of the face portion 16, and a second portion is provided as a removable slider cover 32 having finger tabs 33, which snaps into engagement with the base portion 34 of the neck assembly 30. In either embodiment, the neck assembly 30 provides an opening 36 for passage of the lung bag intermediate the head 12 and torso 14.

The lung bag is made of thin-film polymer material. To make use of the present device, the lung bag is inserted through the mouth opening 20 of the face portion 16 of the head 14, through any neck assembly 30, and laid on the compressible chest of the torso while the outer skin 40 is in an open position, as shown in FIG. 1. The lung bag is a sealed bag to be inflated for simulation of lung inflation, with a single opening formed as a mouth portion of the lung bag. The lung bag is secured to and held flush against the mouth area of face portion 16 by the mechanical means of the holes or cuts in the thin-film lung bag material.

Figure 18:
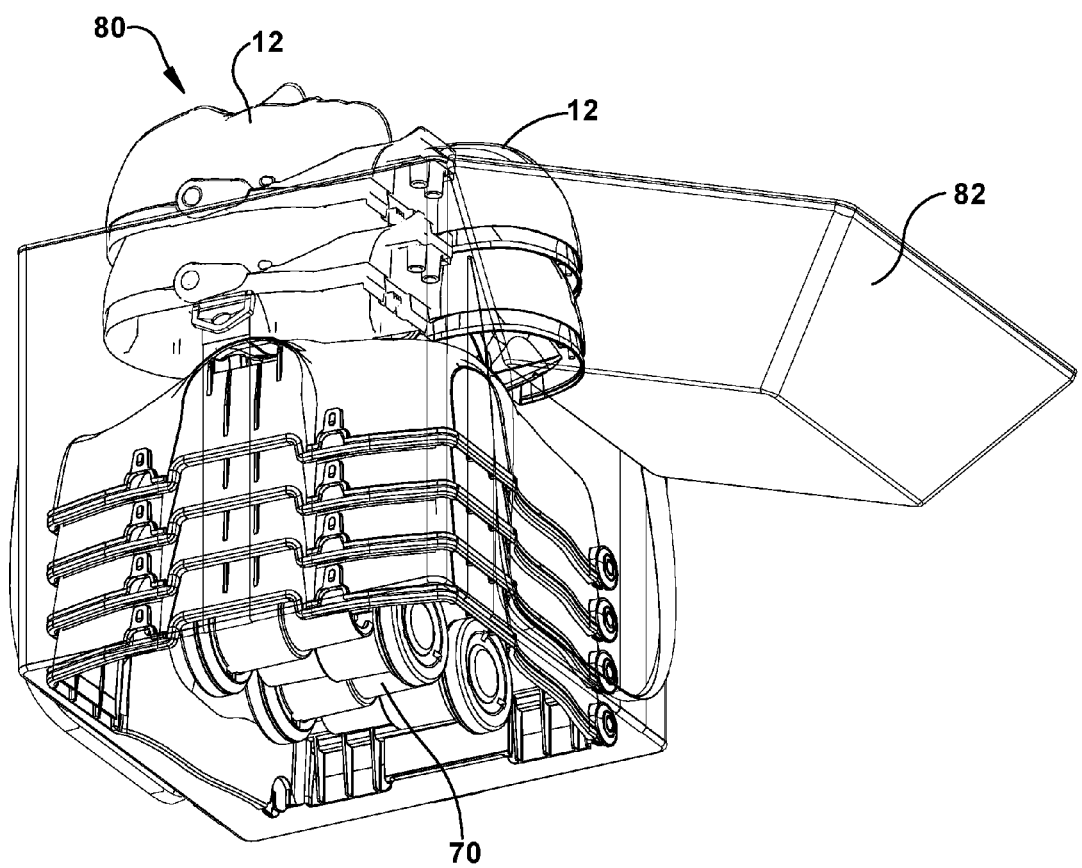
FIG. 18 is a schematic illustration of the portable improved medical training device with the stacked head assemblies positioned over the torso bodies, all shown positioned within a lightweight, flexible carrying container (shown as a transparent container for viewing the packing arrangement), and with the chest compression piston assemblies shown arranged under the stacked torso bodies.
Figure 19:
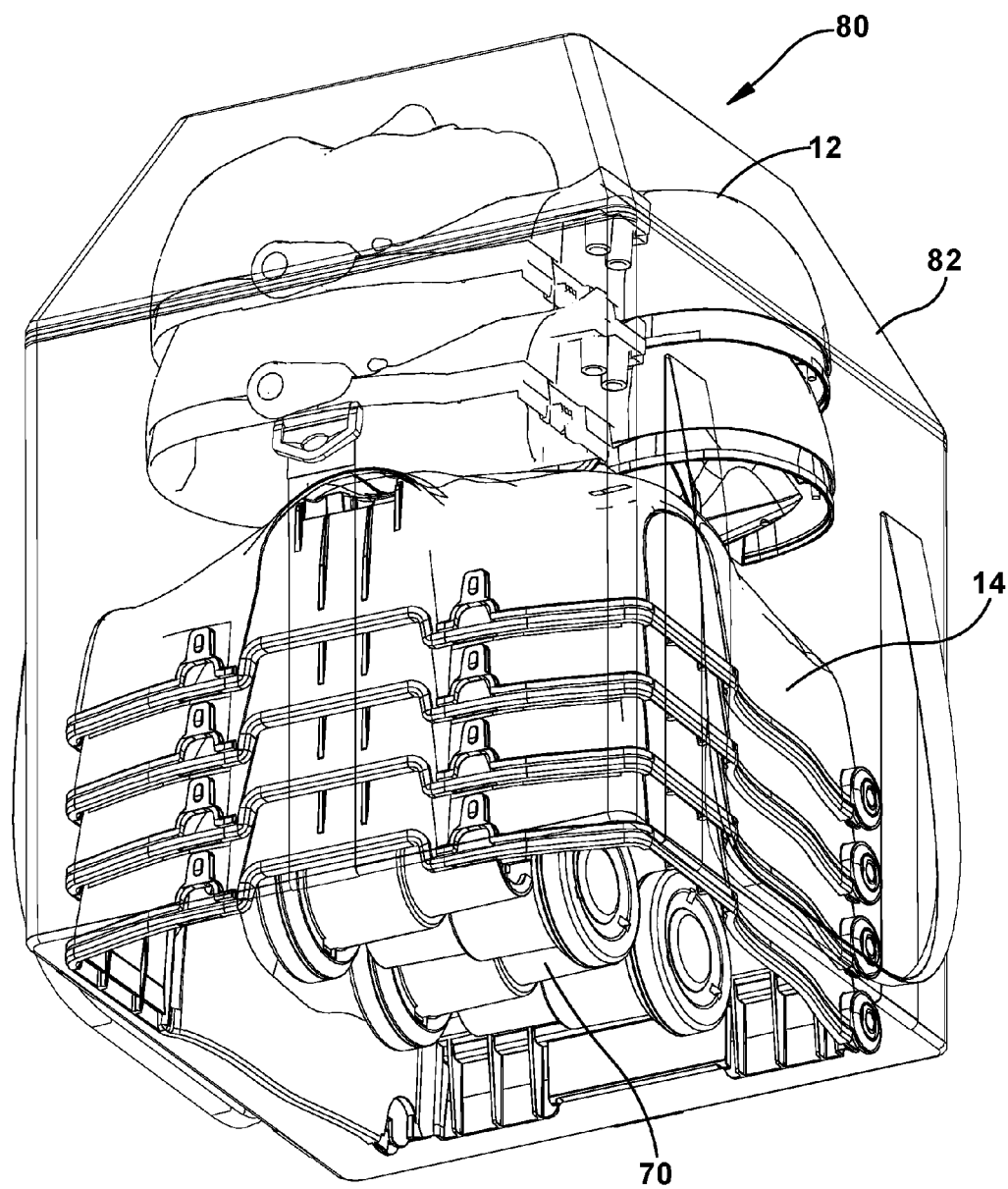
FIG. 19 is a schematic illustration of the portable improved medical training device shown packed and ready for convenient transportation of components for at least 4 training manikins stacked and arranged within a lightweight, flexible carrying container (shown as a transparent container for viewing the packing arrangement).

The arrangement of the two-piece head assembly 12 provides that the back half of the head may be disconnected from the front face and neck, and inverted and nested within the face, in order to provide convenient stacking of the head assembly components. As shown in FIGS. 16, 18 and 19, the single stacked heads may then be further stacked in desired multiples. Likewise, the individual hollow torso bodies are configured for convenient stacking of multiple torso bodies. As shown in FIG. 19, a kit 80 of training manikins is provided in a flexible carrying container 82 for easy quick and easy packing and transportation of manikins The chest compression pistons 70 are also arranged in an alternating pattern of top to bottom, with their central axes in parallel, and within a container under the bottom hollow torso body 14. Larger numbers of components may be stacked to transport the desired manikins.

Finally, the present device may include a CPR rate indicator, which is an electro-mechanical device that provides real time feedback of CPR compression rate being administered by the student on the training manikin device. The feedback is provided directly by visual indicators and indicates whether or not the student is compressing within the preferred compression rate range. Also, the indicator may inform the student concerning what degree of variance there is in the compressions being administered. Indications may be provided as colored illuminated indicators, a numeric readout, or other visual methods. The CPR rate indicator may be provided as an add on module which is integrated within or connected to an existing manikin product so as to be visually accessible to the student while CPR is being performed. The CPR rate indicator is provided integrally with the torso. A window or opening through the skin, or transparent skin, may be provided to enable viewing of the indicator during use of the present training device. Alternatively, the indicator may be provided as an original equipment feature to the manikin product. Where illuminated indicators are provided, they may be color coded to convey the level of student performance, e.g. red is poor, for example, less than 60 compressions per minute; yellow is fair, for example, less than 80 but greater than 60 compressions per minute; green is acceptable, for example, less than 100 but greater than 80 compressions per minute; the illumination of both green lights is a preferred performance, for example, 100 or more compressions per minute; and if desired, illumination and flashing of both green lights may be a more preferred performance rate. The indication may be provided by colored/illuminated indicators, such as LED's, a numeric readout, or other visual method, as well as by audio signals, such as beeps or tonal sounds. Audio signals may be provided as negative sounds, more positive sounds, most positive sounds and double positive sounds, to convey the desired rate performance information. The indicator module is preferably integrated within, or connected to, the manikin 10 to be visually accessible to the student while CPR is being performed on the manikin training device.

The CPR rate indicator (not illustrated) of the present application is preferably desired as a visual training feature, which is passive and, unlike audio feedback, does not interfere with the training exercise. However, it should be understood that audio feedback may have additional desirability under certain training circumstances. Additionally, the visual feedback is preferred over prior art metronome type timing devices which the student attempts to follow and match repeating audible signals that represent the desired frequency of compression. By remaining a passive feature, the visual indicators can be ignored until it is desired by the student or instructor. Further, the real time feedback regarding the compression rate performed is believed superior to other methods which record the compression rate, but the record can only be reviewed after the training exercise is completed. With the present rate indicator device, the student can view the visual indicators while the compressions are in progress, and make concurrent adjustments and improve training performance during the exercise. Also, the CPR rate indicator may be configured to respond with positive visual feedback only when both the compression rate being performed by the student and the depth of compression are properly achieved.

Although the portable medical training device of the present application has been described in detail sufficient for one of ordinary skill in the art to practice the invention, it should be understood that various changes, substitutions and alterations may be made without departing from the spirit or scope of the device as defined in the attached claims. Moreover, the scope of the present device is not intended to be limited to the specific embodiments described here, which are provided by way of example. As one of ordinary skill in the art will readily appreciate from the disclosure of the present device and its embodiments, other components and means presently existing or later to be developed that perform substantially the same function to achieve substantially the same result as those of the corresponding embodiments described here, may be utilized according to the present application. Accordingly, the appended claims are intended to include within their scope such other components or means

We claim:

1. A portable CPR manikin comprising:
a torso having a chest surface including a rigid central chest area simulating a human breast bone, a surrounding chest area having at least two rib sections separated by openings in the chest area, wherein the rib sections are formed by open slots formed through the chest and radiate outwardly from the rigid central chest area in a radial pattern, and movable hinges formed intermediate and interconnecting each rib section with the rigid central chest area.

2. The portable CPR manikin of claim 1 having an open back supportable on a planar work surface, and the torso having sides extending upward from the planar work surface and the rigid central chest area is substantially horizontal and positioned at a height simulating a human chest.

3. The portable CPR manikin of claim 1, wherein a pliable skin is hinged to and covers the torso.

4. The portable CPR manikin of claim 1, wherein the interconnection between the rigid central chest area and the surrounding chest area comprises a mechanical hinge formed with engaged male and female members.

5. The portable CPR manikin of claim 1, wherein the interconnection between the rigid central chest area and the surrounding chest area comprises at least two molded polymer living hinges.

6. The portable CPR manikin of claim 1 having a chest compression piston attached to a bottom of the rigid central chest area.

7. The portable CPR manikin of claim 6, wherein the chest compression piston is removably attached to the bottom of the rigid central chest area.

* * * * *